(12) United States Patent
Yoshida

(10) Patent No.: US 12,181,106 B2
(45) Date of Patent: Dec. 31, 2024

(54) FILLING APPARATUS

(71) Applicant: TATSUNO CORPORATION, Tokyo (JP)

(72) Inventor: Yuichi Yoshida, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 17/189,585

(22) Filed: Mar. 2, 2021

(65) Prior Publication Data

US 2021/0285602 A1    Sep. 16, 2021

(30) Foreign Application Priority Data

Mar. 10, 2020   (JP) ................................. 2020-040863

(51) Int. Cl.
*F17C 5/00*        (2006.01)

(52) U.S. Cl.
CPC ........ *F17C 5/007* (2013.01); *F17C 2205/013* (2013.01); *F17C 2205/0326* (2013.01); *F17C 2205/0352* (2013.01); *F17C 2221/012* (2013.01); *F17C 2250/03* (2013.01); *F17C 2270/0178* (2013.01); *F17C 2270/0184* (2013.01)

(58) Field of Classification Search
CPC .............. F17C 5/007; F17C 2270/0184; F17C 2205/0352; F17C 2221/012; F17C 2250/03; F17C 2205/0326; F17C 2270/0178; F17C 2205/013
USPC .......................................................... 141/4
See application file for complete search history.

(56) References Cited

U.S. PATENT DOCUMENTS

| | | | | |
|---|---|---|---|---|
| 9,016,329 B2 * | 4/2015 | Mori | ......................... | F17C 5/06 141/2 |
| 10,443,784 B2 * | 10/2019 | Miyoshi | ................ | F17C 13/025 |
| 2003/0209282 A1 * | 11/2003 | Satou | ......................... | F17C 5/00 141/97 |
| 2016/0305611 A1 * | 10/2016 | Handa | .................... | F17C 13/028 |
| 2017/0023180 A1 | 1/2017 | Petit et al. | | |
| 2018/0335181 A1 * | 11/2018 | Sinding | ................ | F17C 13/026 |

(Continued)

FOREIGN PATENT DOCUMENTS

| | | |
|---|---|---|
| JP | 2015169262 A | 9/2015 |
| JP | 2018076893 A | 5/2018 |

OTHER PUBLICATIONS

European Search Report for EP 21 16 1419; mailed Jul. 27, 2021.

*Primary Examiner* — Paul J Gray
(74) *Attorney, Agent, or Firm* — Stetina Brunda Garred & Brucker

(57) ABSTRACT

A filling apparatus capable of using a single hydrogen storage container for as long as possible during hydrogen filling and maintaining opening degree of a flow rate adjusting valve within a predetermined range. A filling apparatus (100) includes a plurality of hydrogen storage containers (20: hydrogen cylinders or hydrogen storage tanks), a pipe (1) that connects a filling hose (8) and the hydrogen storage containers (20), a flow rate adjusting valve (3: flow control valve) interposed in the pipe (1), and a control unit (10), and the control unit (10) has functions of adjusting a threshold value for switching the hydrogen storage container (20) communicating with the filling hose (8) to another hydrogen storage container (20) and adjusting valve opening of the flow rate adjusting valve (3).

10 Claims, 5 Drawing Sheets

(56) References Cited

U.S. PATENT DOCUMENTS

2019/0184847 A1\* 6/2019 Mathison .............. F17C 13/028
2019/0277448 A1   9/2019 Krogsgaard et al.

\* cited by examiner

[Fig. 2]
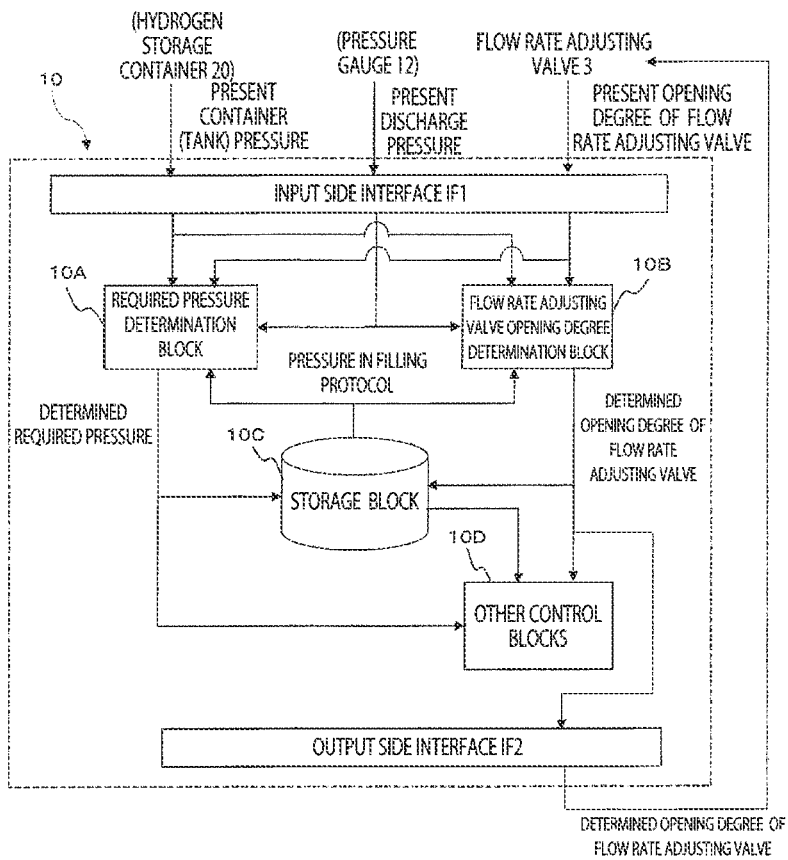
[Fig. 3]
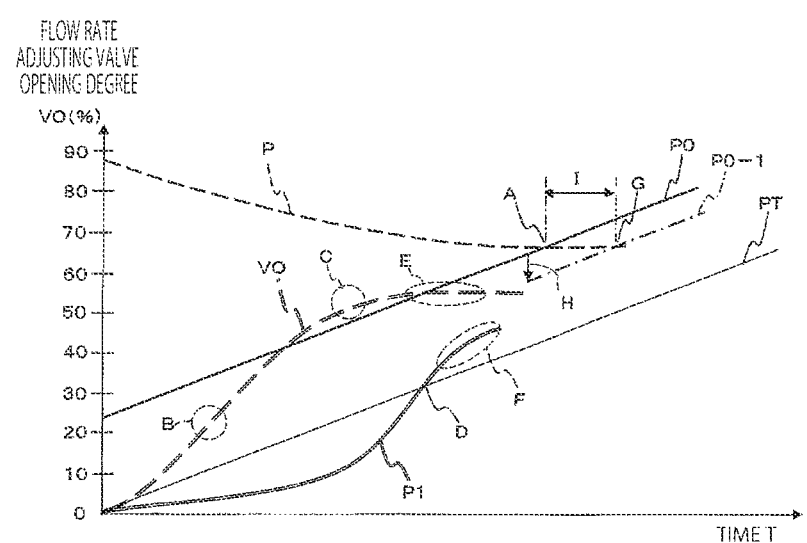

[Fig. 4]
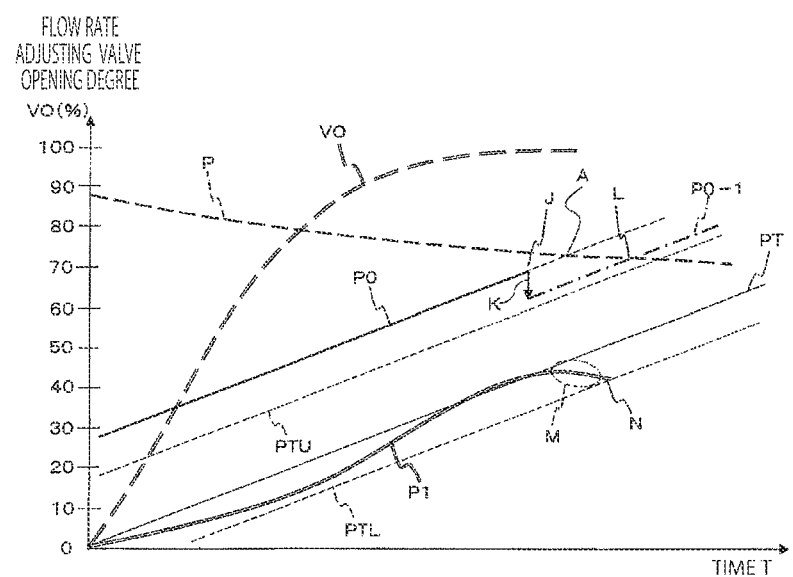
[Fig. 5]
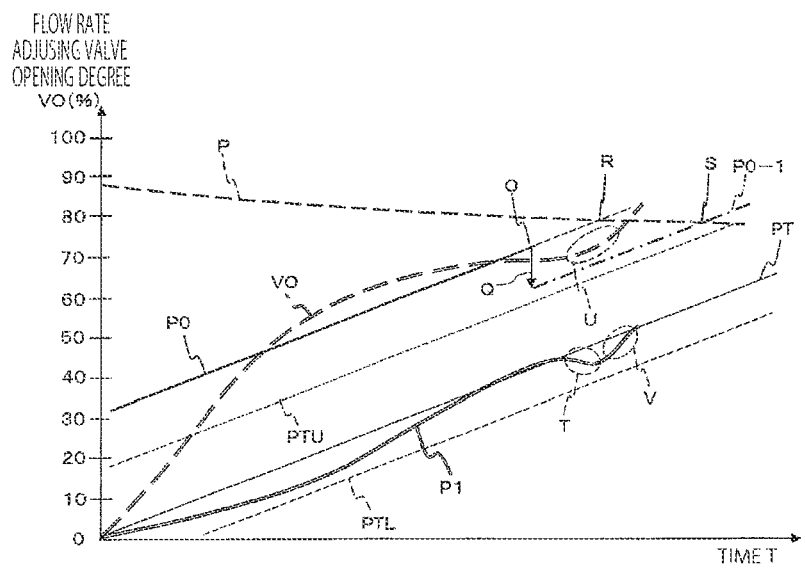

[Fig. 6]
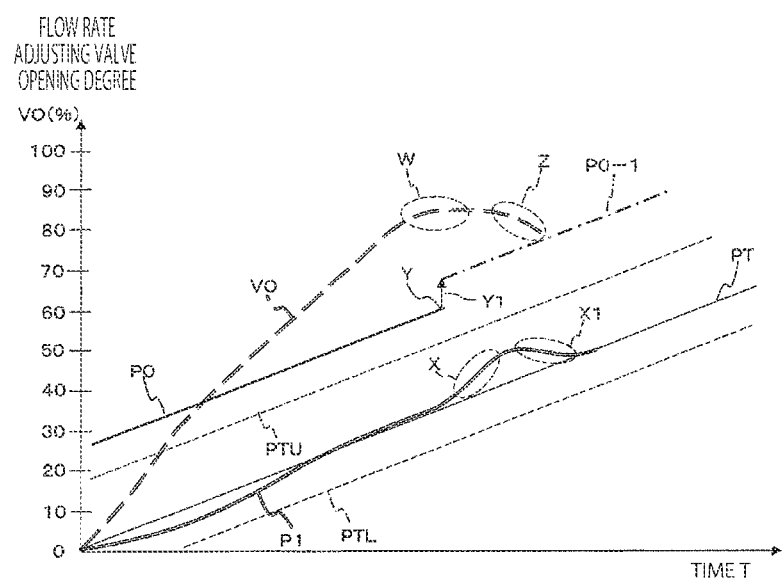

FILLING APPARATUS

CROSS-REFERENCE TO RELATED APPLICATIONS

The present application claims priority to Japanese Patent Application No. 2020-040863 filed on Mar. 10, 2020, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a filling apparatus for filling a fuel gas such as hydrogen gas.

2. Description of the Related Art

In recent years, with development and popularization of vehicles equipped with fuel cells (fuel cell vehicles: FCVs), it has become important to increase the number of hydrogen stations (see, for example, Japanese Patent Publication No. 2000-166635 gazette). The hydrogen station is provided with a hydrogen filling apparatus, and the apparatus fills an in-vehicle tank of a vehicle arriving at the hydrogen station with hydrogen within a predetermined pressure range.

When a fuel cell vehicle is filled with hydrogen at a hydrogen station, in a prior art, a plurality of hydrogen storage containers (for example, hydrogen cylinders or hydrogen storage tanks) with different maximum filling pressures are provided as a rear facility, and the hydrogen storage container supplies hydrogen to a hydrogen filling apparatus. When a pressure inside the hydrogen storage container is lowered as a result of hydrogen supply and becomes lower than a pressure required by the hydrogen filling apparatus side (necessary pressure), the hydrogen storage container is replaced with another hydrogen storage container with higher pressure than the required pressure. Then, the hydrogen storage container with reduced pressure is replaced according to a predetermined procedure. In this type of rear facility, it is preferable to use a single hydrogen storage container for as long as possible, and it is efficient to delay a timing of switching to another hydrogen storage container as much as possible. Here, a flow rate adjusting valve is interposed in a hydrogen pipe of the hydrogen filling apparatus, and it is preferable to maintain opening degree of the flow rate adjusting valve within a predetermined range without significantly changing it at hydrogen filling.

However, in hydrogen filling, pressure and temperature of a container to be filled with hydrogen (for example, a hydrogen tank of a fuel cell vehicle) must be maintained within predetermined ranges according to filling protocol. Therefore, controlling filling pressure according to the filling protocol is prioritized over keeping opening of the flow rate adjusting valve within a predetermined range, and it is difficult to use a single hydrogen storage container for as long as possible. For the same reason, it was difficult to maintain the opening degree of the flow rate adjusting valve within a predetermined range.

The content of Japanese Patent Publication No. 2000-166635 gazette is incorporated herein by reference in its entirety.

BRIEF SUMMARY

The present invention has been proposed in view of the above-mentioned problems of the prior art, and the object thereof is to provide a filling apparatus that can use a single hydrogen storage container for as long as possible during hydrogen filling and can maintain opening of a flow rate adjusting valve within a predetermined range.

The filling apparatus (100) of the present invention is characterized by including a plurality of hydrogen storage containers (20: for example, hydrogen cylinders or hydrogen storage tanks), a pipe (1) that communicates a filling hose (8) and the hydrogen storage containers (20), a flow rate adjusting valve (3: flow control valve) interposed in the pipe (1), and a control unit (10), wherein the control unit (10) has a function of adjusting a threshold value (P0: required pressure) for switching the hydrogen storage container (20) communicating with the filling hose (8) to another hydrogen storage container (20), and a function of adjusting valve opening degree (VO) of a flow rate adjusting valve (3). Here, it is preferable that the control unit (10) has a function of adjusting the valve opening degree (VO) of the flow rate adjusting valve (3) within a range (for example, 70 to 80%) where load on the flow rate adjusting valve (3) is small.

In the filling apparatus (100) of the present invention, it is preferable that the control unit (10) has, when a pressure (P) in the hydrogen storage container (20: for example, a hydrogen cylinder or a hydrogen storage tank) is lowered, and a threshold value (P0: required pressure: tank switching threshold value) for switching the hydrogen storage container (20) approaches to another hydrogen storage container (20), a function of lowering the threshold value (P0) to delay a timing at which the pressure (P) in the hydrogen storage container becomes equal to the threshold value (P0).

Further, in the filling apparatus (100) of the present invention, the control unit (10) preferably has a function of reducing the valve opening degree (VO) of the flow rate adjusting valve (3) when the control unit (10) compares the discharge pressure (P1) with an upper limit value in the filling protocol and the discharge pressure (P1) approaches the upper limit value in the filling protocol. In addition, the control unit (10) preferably has a function of increasing the valve opening degree (VO) of the flow rate adjusting valve (3) when the control unit (10) compares discharge pressure (P1) with a lower limit value in the filling protocol and the discharge pressure (P1) approaches the lower limit value in the filling protocol.

A hydrogen filling method of the present invention using the hydrogen filling apparatus (100: claimed in claim 1) described above that includes the plurality of hydrogen storage containers (20: for example, hydrogen cylinders or hydrogen storage tanks), the pipe (1) communicating the filling hose (8) and the hydrogen storage container (20), the flow rate adjusting valve (3: flow control valve) interposed in the pipe (1), and the method is characterized in having a step of adjusting the threshold value (P0: required pressure) for switching the hydrogen storage container (20) to another hydrogen storage container (20) and a step of adjusting the valve opening degree (VO) of the flow rate adjusting valve (3). Here, the valve opening degree (VO) of the flow rate adjusting valve (3) is preferably adjusted within a range (for example, 70 to 80%) where load on the flow rate adjusting valve (3) is small.

The filling method of the present invention preferably has, when for example, an internal pressure (P) of the hydrogen storage container (20: for example, a hydrogen cylinder or a hydrogen storage tank) is lowered and approaches the threshold value (P0: required pressure: tank switching threshold value) to switch the hydrogen storage container (20) to another hydrogen storage container (20), a step of lowering the threshold value (P0) to delay a timing at which the pressure (P) in the hydrogen storage container becomes equal to the threshold value (P0).

Further, the filling method of the present invention preferably has a step of comparing the discharge pressure (P1) with an upper limit value in the filling protocol and reducing the opening degree (VO) of the flow rate adjusting valve (3) when the discharge pressure (P1) approaches the upper limit value in the filling protocol. In addition, the filling method of the present invention preferably has a step of comparing discharge pressure (P1) with a lower limit value in the filling protocol and increasing the valve opening degree (VO) of the flow rate adjusting valve (3) when the discharge pressure (P1) approaches the lower limit value in the filling protocol.

The present invention with the above-described configuration has a functions of adjusting the threshold value (P0: required pressure) for switching the hydrogen storage container (20) to another hydrogen storage container (20) and the valve opening (VO) of the flow rate adjusting valve (3), so that when the internal pressure (P) of the hydrogen storage container (20: for example, a hydrogen cylinder or a hydrogen storage tank) is lowered and approaches the threshold value (P0: required pressure: tank switching threshold value) for switching to another hydrogen storage container (20), the threshold value (P0) is lowered to delay a timing at which the pressure (P) in the hydrogen storage container becomes equal to the threshold value (P0) (a timing at which a characteristic curve of the tank switching threshold P0 and a characteristic curve of the pressure P in the tank intersect) as compared with a timing in a prior art, and accordingly a timing of switching the hydrogen storage container (20) to another hydrogen storage container (20) can be delayed.

However, when performing the delay control, in which the threshold value (P0) for switching the hydrogen storage container (20) to another hydrogen storage container (20) is lowered, and the timing for switching the hydrogen storage container (20) to another hydrogen storage container (20) is delayed, it is necessary to ensure that the discharge pressure (P1) of the hydrogen filling apparatus (100) does not deviate from a range of the filling protocol (between the upper and lower thresholds). With the present invention, by keeping the flow rate control valve opening (VO) within an appropriate range, when lowering the threshold value (P0) for switching the hydrogen storage container (20) to another hydrogen storage container (20) may cause the discharge pressure (P1) to fall below the lower limit of the filling protocol, the flow rate control valve opening (VO) is increased to increase the discharge pressure (P1), which prevents the discharge pressure (P1) from falling below the lower limit of the filling protocol. Similarly, when lowering the threshold value (P0) for switching the hydrogen storage container (20) to another hydrogen storage container (20) may cause the discharge pressure (P1) to fall and to be separated from the target value (PT) of the filling protocol also, the flow rate control valve opening (VO) is increased to increase the discharge pressure (P1), which allows the discharge pressure (P1) to approach the target value (PT) of the filling protocol.

Further, by keeping the flow rate adjusting valve opening (VO) within an appropriate range, when the flow rate adjusting valve opening (VO) is large (for example, 80% or more), and the threshold value (P0) for switching the hydrogen storage container (20) to another hydrogen storage container (20) is increased, reducing the flow rate control valve opening (VO) allows the discharge pressure (P1) to be kept away from the upper limit pressure of the filling protocol. That is, in the present invention, the threshold value (P0: required pressure) for switching the hydrogen storage container (20) to another hydrogen storage container (20) is adjusted, and the valve opening (VO) of the flow rate adjusting valve (3) is adjusted, so that a single hydrogen storage vessel (20) can be used for as long as possible while controlling filling pressure according to the filling protocol, and the flow rate adjusting valve opening (VO) can be maintained in a rage (for example, 70% to 80%) where load on the flow rate adjusting valve (3) is the smallest.

BRIEF DESCRIPTION OF THE DRAWINGS

FIG. 2 is a functional block diagram showing a control unit according to the illustrated embodiment.

FIG. 3 is a characteristic diagram showing an outline of various parameters in the embodiment.

FIG. 4 is a characteristic diagram showing another outline of various parameters, different from FIG. 2, of the embodiment.

FIG. 5 is a characteristic diagram showing another outline of various parameters, different from FIGS. 2 and 3, of the embodiment.

FIG. 6 is a characteristic diagram showing another outline of various parameter, different from FIGS. 2 to 4, of the embodiment.

DETAILED DESCRIPTION

Figure 1:
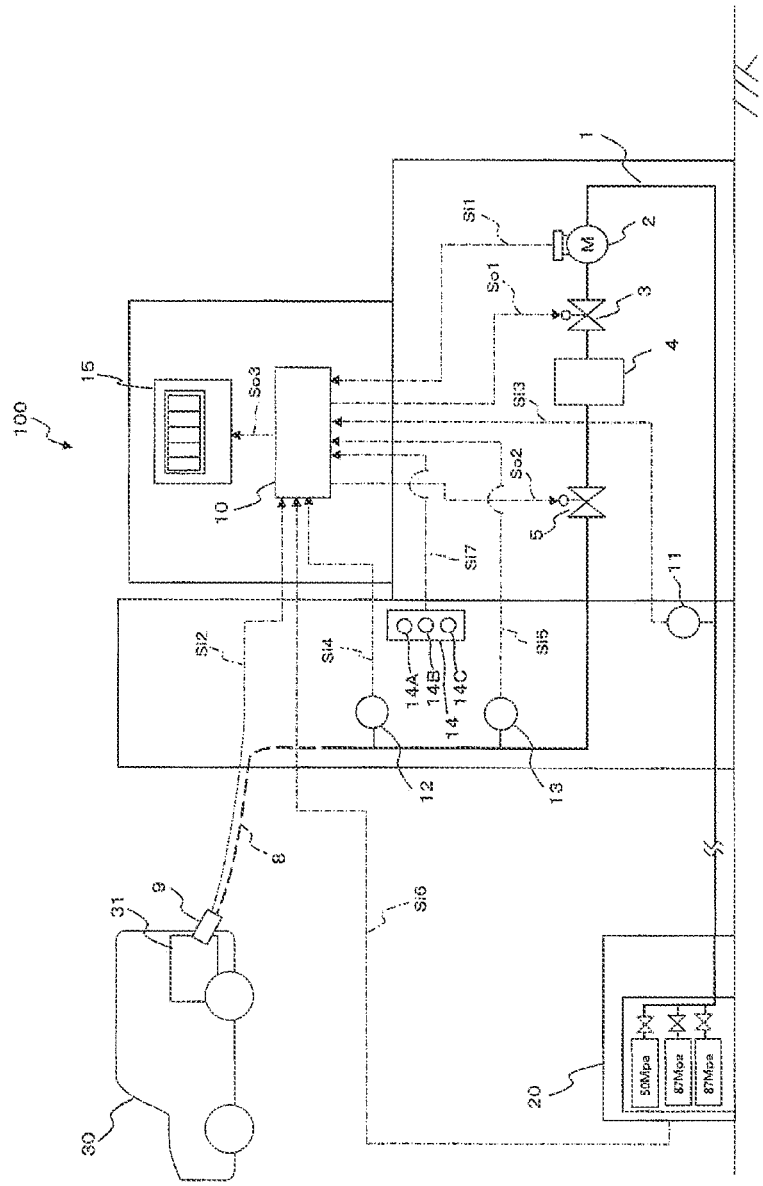
FIG. 1 is an explanatory drawing showing an outline of a filling apparatus according to an embodiment of the present invention.

Hereinafter, an embodiment of the present invention will be described with reference to the accompanying drawings. In the illustrated embodiment, a case where a gas to be filled is hydrogen is shown, but the filling apparatus according to the illustrated embodiment can also be applied to filling of other gases. First, an outline of the hydrogen filling apparatus according to the embodiment of the present invention will be described with reference to FIG. 1. In FIG. 1, the hydrogen filling apparatus represented by the reference numeral 100 has a hydrogen supply pipe 1 and a control unit 10. An upstream side of the hydrogen supply pipe 1 is connected to a hydrogen storage container 20 (for example, a hydrogen cylinder or a hydrogen storage tank) which is a hydrogen gas supply source, and a downstream side of the hydrogen supply pipe 1 communicates with a filling hose 8 and a filling nozzle 9, at the time of filling, the hydrogen supply pipe 1 is connected to a vehicle side tank 31 of a vehicle 30 (fuel cell vehicle). A flow meter 2, a flow rate adjusting valve 3 (pressure adjusting valve), a cooling unit 4 (gas pipeline cooling unit), and a shutoff valve 5 are interposed in the hydrogen supply pipe 1.

A plurality of hydrogen storage containers 20 (three in FIG. 1) are provided, and maximum filling pressures of the plurality of hydrogen storage containers 20 are different from each other. As a result of filling the vehicle 30 with hydrogen, when a pressure in the hydrogen storage container 20 (during hydrogen supply) is lowered to a lower pressure than a pressure (required pressure) required by the hydrogen filling apparatus 100 side, the hydrogen storage containers 20 is switched to one of the other two hydrogen storage containers 20 filled with hydrogen at a pressure higher than the required pressure. In FIG. 1, reference numeral 20 comprehensively indicates a plurality (three) prepared hydrogen storage containers, but in the present specification, a single hydrogen storage container may be represented by the reference numeral 20. Hydrogen stored in the hydrogen storage container 20 is fueled with the hydrogen supply pipe 1, via the flow meter 2, the flow rate adjusting valve 3, the cooling unit 4, and the shutoff valve 5, and through the filling hose 8 and the filling nozzle 9 to the vehicle side tank 31 of the fuel cell vehicle 30.

In FIG. 1, the control unit 10 acquires measurement result of the flow meter 2 via a measurement signal line Si1 and transmits a control signal to the flow rate adjusting valve 3 via a control signal line So1. Further, the control unit 10 has, when ending or stopping filling, a function of transmitting a control signal to the flow rate adjusting valve 3 and the shutoff valve 5 via control signal lines So1 and So2 respectively to shut the flow rate adjusting valve 3 and the shutoff valve 3. The cooling unit 4 has a function of lowering temperature of hydrogen to be charged at the time of hydrogen filling, and for example, an existing heat exchange device type is used.

Tank pressure, tank temperature, and other information in the vehicle-side tank 31 are transmitted to the control unit 10 by a vehicle communication filling system via a measurement signal line Si2. On the filling apparatus 100 side, necessary information and signals are exchanged with the flow meter 2, the flow rate adjusting valve 3, the shutoff valve 5, etc. based on the pressure, temperature, and other information in the vehicle side tank 31, and for example, hydrogen gas is supplied to the vehicle side tank 31 according to filling protocol in response to a pressure difference from an inside of the vehicle side tank 31.

In FIG. 1, the hydrogen supply pipe 1 of the hydrogen filling apparatus 100 is provided with an inlet pressure gauge 11 (inlet pressure sensor) and a discharge pressure gauge 12 (discharge pressure sensor). The inlet pressure gauge 11 measures a pressure in a region on the hydrogen storage container 20 side in the hydrogen supply pipe 1, and transmits measurement result to the control unit 10 via a measurement signal line Si3. The discharge pressure gauge 12 measures a pressure in a region on the filling nozzle 9 side in the hydrogen supply pipe 1, and transmits measurement result to the control unit 10 via a measurement signal line Si4. An outlet-side thermometer 13 (temperature sensor) is interposed in the hydrogen supply pipe 1, the outlet-side thermometer 13 measures a temperature inside the hydrogen supply pipe 1, and sends measurement result to the control unit 10 via a measurement signal line Si5. The control unit 10 acquires a pressure in the hydrogen storage container 20 via a measurement signal line Si6.

In FIG. 1, the hydrogen filling apparatus 100 is provided with a switch unit 14, and the switch unit 14 includes a charging start switch 14A that is operated at a start of hydrogen filling and a filling stop switch 14B that is operated at an end of hydrogen filling and stopping the filling, and an emergency stop switch 14C that operates at a time of emergency stop. The operation of each of the switches 14A to 14C in the switch unit 14 is transmitted to the control unit 10 via an input signal line Si7. Further, the hydrogen filling apparatus 100 is provided with a display device 15, which acquires a control signal transmitted from the control unit 10 via a control signal line So3 and displays various parameters (mass of hydrogen filled in the vehicle at that time etc.).

Next, the control unit 10 will be described with reference to FIG. 2. In FIG. 2, the control unit 10 of the hydrogen filling apparatus 100 is shown by being entirely surrounded by a dotted line, and includes a required pressure determination block 10A, a flow rate adjusting valve opening degree determination block 10B, and a storage block 10C and other control blocks 10D. The required pressure determination block 10A acquires information on a pressure inside the hydrogen storage container 20 supplying hydrogen via an input side interface IF1, and acquires information on a discharge pressure from the pressure gauge 12, and acquires information on the flow rate adjusting valve opening from the flow rate adjusting valve 3.

The flow rate adjusting valve opening degree determination block 10B acquires information on a pressure inside the hydrogen storage container 20 that supplies hydrogen, and acquires discharge pressure information from the pressure gauge 12, and acquires the flow rate adjusting valve degree information from the flow rate adjusting valve 3. The storage block 10C has a function of storing information necessary for hydrogen filling control, and provides stored information at a request of the required pressure determination block 10A and the flow rate adjusting valve opening degree determination block 10B as needed. In the storage block 10C, for example, are stored a discharge pressure characteristics (target value) and an allowable range (upper limit value, lower limit value) according to the filling protocol, a threshold value for switching the hydrogen storage container 20 whose tank pressure has dropped due to hydrogen supply to another hydrogen storage container 20 (required pressure), falling or rising width when adjusting the threshold value, adjusting width of the flow rate adjusting valve opening when adjusting the discharge pressure, etc. Further, the storage block 10C has a function of acquiring and storing a required pressure determined by the required pressure determination block 10A and a flow rate adjusting valve opening degree determined by the flow rate adjusting valve opening degree determination block 10B.

The required pressure determination block 10A has functions of acquiring an internal pressure, a discharge pressure, and a flow rate adjusting valve opening degree of the hydrogen storage container 20; acquiring a discharge pressure characteristic in the filling protocol, a threshold value (required pressure) for switching the hydrogen storage container 20, a determination result thereof, and a decrease width and an increase of the threshold value when adjusting the threshold value from the storage block 10C; and determining the required pressure (threshold value for switching the hydrogen storage container 20). The required pressure (threshold value) determined by the required pressure determination block 10A is transmitted to the storage block 10C and other control blocks 10D via signal lines.

The flow rate adjusting valve opening degree determination block 10B has functions of acquiring, in addition to the pressure inside the hydrogen storage container 20, the discharge pressure, and the opening of the flow rate adjusting valve, the discharge pressure characteristic in the filling protocol, the adjustment width of the flow rate adjusting valve opening degree when adjusting the discharge pressure, and the like from the storage block 10C, and determining the flow rate adjusting valve opening degree. Further, the block 10B has a function of adjusting the flow rate adjusting valve opening degree within a range in which load on the flow rate adjusting valve 3 is small. The flow rate adjusting valve opening degree determined by the flow rate adjusting valve opening degree determination block 10B is transmitted to the storage block 10C and other control blocks 10D, and is transmitted to the flow rate control valve 3 via an outlet side interface IF2.

The other control blocks 10D comprehensively represent a functional block that executes control required for hydrogen filling in the hydrogen filling apparatus 100. Specific control contents of hydrogen filling in the hydrogen filling apparatus 100 will be described later with reference to FIGS. 3 to 7.

Various parameters or characteristics in the illustrated embodiment will be described with reference to FIGS. 3 to 6. In FIG. 3 are shown a target pressure characteristic PT in the filling protocol, an inner pressure P of the hydrogen storage container 20, a required pressure P0 (pressure as a threshold value for switching the hydrogen storage container 20 with lowered pressure to another hydrogen storage container 20), a discharge pressure P1 in the filling apparatus 100, and a valve opening degree (flow rate adjusting valve opening degree) VO of the flow rate adjusting valve 3. In FIGS. 3 to 6, the horizontal axis represents time, and the vertical axis represents valve opening (%) and pressure (MPa) of the flow rate adjusting valve 3. With reference to FIG. 3, problems in the prior art and an outline of control in the illustrated embodiment will be described.

Figure 7:
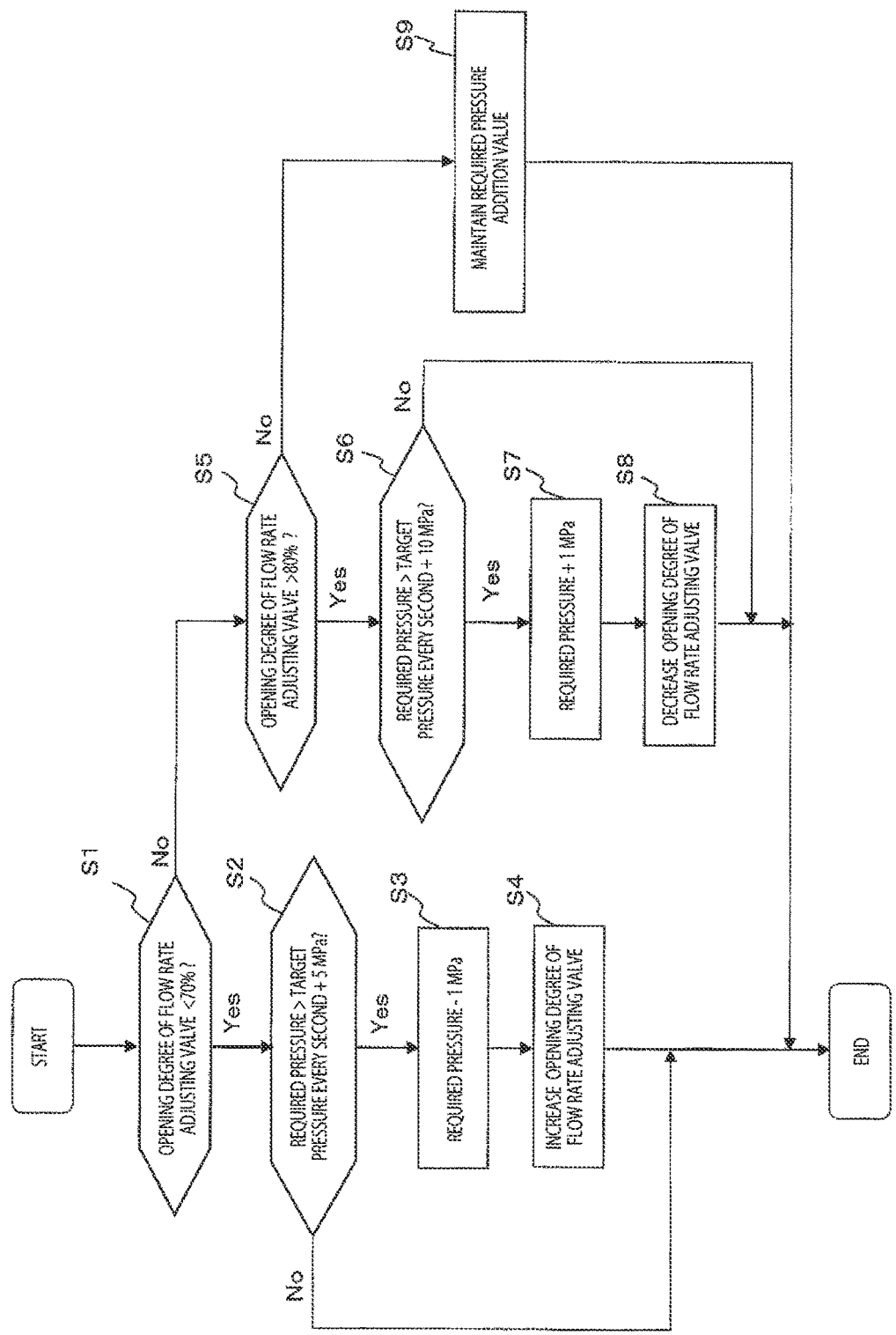
FIG. 7 is a flowchart showing control in the embodiment.

The target pressure characteristic PT in the filling protocol of FIG. 3 corresponds to the "target pressure every second" in the flowchart of FIG. 7. The pressure P inside the hydrogen storage container 20 gradually decreases (steps down) as hydrogen filling proceeds. The threshold value P0 (required pressure: tank switching threshold value) for switching the hydrogen storage container 20 (tank) to another hydrogen storage container 20 is increased as hydrogen filling proceeds. Then, when the pressure P in the tank of the hydrogen storage container 20 becomes equal to the switching threshold value P0 of the hydrogen storage container (timing of reference numeral A), the hydrogen storage container 20 is switched to another hydrogen storage container 20.

In FIG. 3, as is clear from the characteristic curve of the flow rate adjusting valve opening VO, in the region B (the region on the left side of FIG. 3) where the discharge pressure P1 at initial stage of hydrogen filling is low, control is performed to increase the flow rate adjusting valve opening VO, and the region in which the flow rate adjusting valve opening VO is increased is indicated by reference numeral C. When the flow rate adjusting valve opening VO increases, the discharge pressure P1 increases, and the discharge pressure P1 reaches the target value pressure characteristic PT (reference numeral D), the flow rate adjusting valve opening VO is maintained unchanged (region E). However, the flow rate adjusting valve opening VO becomes large, and the discharge pressure P1 deviates from the target pressure PT to high pressure side as shown in the region F. In such a case, it is necessary to reduce the flow rate adjusting valve opening VO. Here, in the prior art, even if the state shown in the region F is reached, the tank switching threshold value P0 (required pressure) does not fluctuate, and the timing for switching the hydrogen storage container 20 to another hydrogen storage container 20 does not change from the timing of the reference numeral A. In other words, in the prior art, it is impossible that the timing of switching tanks is moved to the right side of FIG. 3 (the side where time elapses), and hydrogen is continuously supplied from the single hydrogen storage container 20 for as long as possible.

On the other hand, in the illustrated embodiment, when the inner pressure P of the hydrogen storage container 20 is lowered and the timing of replacement of the hydrogen storage container 20 (reference numeral A) approaches, the tank switching threshold value P0 (required pressure) is lowered (arrow H) to the characteristic curve shown by the alternate long and short dash line P0-1 in FIG. 3. Moving the characteristic curve of the tank switching threshold value P0 downward to the characteristic curve P0-1 allows the timing at which the characteristic curve of the pressure P in the hydrogen storage container 20 intersects with the characteristic curve of the tank switching threshold value P0-1 (the characteristic curve moved downward) is the timing indicated by the symbol G. The timing G moves in the right direction (time elapsed side) in FIG. 3 as compared with the timing A (switching timing when the tank switching threshold value P0 is not moved downward) by only the time indicated by reference numeral I, and the timing of tank switching is delayed, so that the hydrogen storage container 20 (tank) can be used for a longer time by that amount.

In hydrogen filling control, it is necessary to prevent the discharge pressure P1 from deviating from the range of the filling protocol (upper limit threshold value and lower limit threshold value: not shown in FIG. 3). However, if the flow rate adjusting valve opening is always fully opened (opening 100%) at hydrogen filling, lowering the tank switching threshold may cause the discharge pressure P1 to fall below the lower limit of the filling protocol. Such a possibility will be described with reference to FIG. 4. In FIG. 4, pressure range allowed by the filling protocol is the range between the upper threshold PTU and the lower threshold PTL. In the illustrated embodiment, for example, the upper limit threshold PTU is set to "target pressure characteristic PT+7 MPa", and the lower limit threshold PTL is set to "target pressure PT-2.5 MPa".

In FIG. 4, in a state where the flow rate adjusting valve opening VO has reached 100%, the tank switching threshold value P0 is moved to the characteristic curve P0-1, as shown by the arrow K to the lower side of FIG. 4 at the timing of the reference numeral J. When the tank switching threshold value P0 is not lowered, the tank switching timing is the intersection A between the characteristic curve P0 and the characteristic curve P. Therefore, when the tank switching threshold value P0 is reduced as shown by the characteristic curve P0-1, the timing of tank switching is the timing indicated by the reference numeral L in FIG. 4, and is moved right in FIG. 4 as compared with the timing A.

Here, when the tank switching threshold value P0 is lowered, the discharge pressure P1 is also lowered. Therefore, after the timing J (the region on the right side of FIG. 4), there is a possibility that the discharge pressure P1 may decrease, and approach and fall below the lower limit PTL of the filling protocol as shown in a region M. Here, since the flow rate adjusting valve opening VO is already 100%, it is not possible to control the flow rate adjusting valve opening VO to be further increased to increase the discharge pressure P1. Therefore, there is an inconvenience that the discharge pressure P1 falls below the lower limit value PTL of the filling protocol at a timing indicated by the symbol N, and hydrogen filling is stopped. Therefore, in order to use the single hydrogen storage container 20 for as long as possible (delay the timing of tank switching), it is inconvenient to execute the control for lowering the tank switching threshold value P0 (required pressure) when the flow rate adjusting valve opening VO is fully open or close to it.

Next, control of a state in which the flow rate adjusting valve opening degree is relatively low (for example, a state in which the flow rate adjusting valve opening degree VO is 70% or less) will be described with reference to FIG. 5. However, the valve opening of "70%" is an example. In FIG. 5, since the pressure P in the hydrogen storage container 20 was close to the tank switching threshold value P0 (required pressure) when the flow rate adjusting valve opening VO reached the vicinity of 70%, at the timing indicated by reference numeral O, the tank switching threshold value P0 (required pressure) is lowered (arrow Q: corresponding to step S3 in FIG. 7). In FIG. 4, the characteristic curve P0 when the tank switching threshold value P0 is not lowered at the timing indicated by the reference numeral O is shown by a broken line after the timing O. Lowering the tank switching threshold P0 allows the tank switching timing to be extended from the timing R when the tank switching threshold P0 is not lowered to the timing S when the tank switching threshold P0 is lowered.

Since the tank switching threshold value P0 was lowered at the timing O, as shown in a region T, the discharge pressure P1 drops, separating from the target pressure characteristic PT in the filling protocol and approaching the lower limit pressure in the filling protocol. On the other hand, if the flow rate adjusting valve opening VO is increased in a region indicated by the symbol U of the characteristic curve of the flow rate adjusting valve opening VO (corresponding to step S4 in FIG. 7), as shown by a region V of the characteristic curve of the discharge pressure P1, the discharge pressure P1 is boosted and approaches the target pressure characteristic PT.

Next, with reference to FIG. 6, control when the flow rate adjusting valve opening degree exceeds 80% will be described. However, the valve opening of "80%" is an example. In FIG. 6, in a region W in the characteristic curve of the flow rate adjusting valve opening VO, the flow rate adjusting valve opening VO exceeds 80%, and the discharge pressure P1 is boosted as shown in a region X and is approaching the upper limit pressure PTU in the filling protocol. In the region W, when the tank switching threshold value P0 (required pressure) is also boosted at the timing Y (arrow Y1: corresponding to step S7 in FIG. 7), the discharge pressure P1 is also boosted in the region X. The boosting of the discharge pressure P1 in the region X is based on both the increase of the flow rate adjusting valve opening VO and the boosting of the tank switching threshold value P0 (required pressure). Since the discharge pressure P1 is boosted in the region X and approaches the upper limit pressure PTU, in a region Z, the flow rate adjusting valve opening VO is reduced, and as shown in a region X1, the discharge pressure P1 is decreased to separate from the upper limit pressure PTU (corresponding to step S8 in FIG. 7). In FIG. 6, the tank switching threshold value P0 (required pressure) is boosted at the timing Y because the filling operation has already proceeded when the flow rate adjusting valve opening VO exceeds 80%, and it is assumed that a pressure of the target (for example, the fuel container of a fuel cell vehicle) is also high. Therefore, it is not necessary to continue to use the hydrogen storage container 20 whose pressure has decreased, and it is not necessary to postpone the timing of switching to the new hydrogen storage container 20.

The control of the illustrated embodiment will be described mainly with reference to FIG. 7. At hydrogen filling, the flow rate adjusting valve opening VO is zero (VO=0) at a start of filling, and then the flow rate adjusting valve opening VO is increased to adjust to, for example, VO=70 to 80%. As described above with reference to FIGS. 3 to 6, when the flow rate adjusting valve opening VO exceeds 80%, it becomes difficult to increase the discharge pressure P1 by the flow rate adjusting valve opening VO, so that when the flow rate adjusting valve opening VO exceeds 80%, control different from a case where the flow rate adjusting valve opening VO is 80% or less is required.

Therefore, in FIG. 7, it is controlled separately when the flow rate adjusting valve opening VO is less than 70%, when VO=70% to 80%, when the flow rate adjusting valve opening VO exceeds 80% (latter term of filling).

In FIG. 7, in step S1, it is determined whether or not the valve opening VO of the flow rate adjusting valve 3 is less than 70%. In step S1, if the flow rate adjusting valve opening VO is less than 70% (step S1 is "Yes"), the process proceeds to step S2, and if the flow rate adjusting valve opening VO is not less than 70% (step S1 is "No"), the process proceeds to step S5. In step S2 (VO is less than 70%), it is determined whether or not the required pressure P0 (tank switching threshold value) is larger than "target pressure every second+5 MPa". Here, the "target pressure every second" is the target pressure PT in the filling protocol in FIGS. 3 to 6. Further, the required pressure P0 (tank switching threshold value) is set to "required pressure P0=target pressure every second+10 MPa" at start of filling. In the illustrated embodiment, the required pressure P0 is controlled between "target pressure every second+5 MPa" and "target pressure every second+10 MPa". The required pressure P0 can be set to a value other than the above, depending on filling specifications and conditions.

In step S2, if the required pressure P0 is larger than "target pressure+5 MPa every second" (step S2 is "Yes"), the process proceeds to step S3, and when the required pressure P0 is not larger than "target pressure every second+5 MPa" (step S2 is "No"), the control is terminated (end), and the control is restarted after a predetermined control cycle (start). Further, in step S2, the required pressure P0 (tank switching threshold value) at the start (at the start of filling) is "target pressure every second+10 MPa", and is higher than "target pressure every second+5 MPa". Therefore, immediately after the start of filling, step S2 is "Yes".

In step S3 (required pressure P0 is larger than "target pressure+5 MPa every second"), the required pressure P0 is lowered by 1 MPa by the required pressure determination block 10A of the control unit 10. Lowering the required pressure can delay the timing of switching the hydrogen storage container 20 to another hydrogen storage container 20. In the illustrated embodiment, control is performed to reduce the required pressure P0 as necessary (1 MPa each). However, the amount of decompression need not be limited to 1 MPa.

When the required pressure (tank switching threshold value) drops in step S3, along with this, the discharge pressure P1 may decrease and approach the lower limit pressure PTL (target pressure PT-2.5 MPa) in the filling protocol (the region M in FIG. 4 and the region T in FIG. 5). Therefore, in step S4, it is necessary to increase the valve opening VO (flow regulating valve opening) of the flow rate adjusting valve 3 to increase the discharge pressure P1 by the flow rate adjusting valve opening degree determining block 10B of the control unit 10. In step S4, the flow rate adjusting valve opening VO is increased, and the discharge pressure P1 is increased so as to approach the target pressure PT (region V in FIG. 5). After step S4 is finished, the control ends, and after a predetermined control cycle, the control starts again.

In step S5 (when the flow rate adjusting valve opening VO is not less than 70%), it is determined whether or not the flow rate adjusting valve opening VO is larger than 80%. In step S5, if the flow rate adjusting valve opening VO is larger than 80% (step S5 is "Yes"), the process proceeds to step S6, and if the flow rate adjusting valve opening VO is not larger than 80% (step S5 is "No"), the process proceeds to step S9.

In step S6, it is determined whether or not the required pressure P0 (tank switching threshold value) is less than "target pressure every second+10 MPa". As a result of the determination in step S6, if the required pressure P0 is less than "target pressure+10 MPa every second" (step S6 is "Yes"), the process proceeds to step S7, and when the required pressure P0 is not less than "target pressure every second+10 MPa" (step S6 is "No"), the control is terminated, and the control starts again after a predetermined control cycle.

In step S7, the required pressure P0 (tank switching threshold value) is increased by 1 MPa by the required pressure determination block 10A of the control unit 10. When the flow rate adjusting valve opening VO is large (for example, the flow rate adjusting valve opening VO>80%) and the required pressure P0 is decreased and the discharge pressure P1 is reduced, the flow rate adjusting valve is fully open or close to it, as described above in FIG. 4, it may be insufficient to increase the discharge pressure P1 by increasing the flow rate adjusting valve opening VO. Therefore, the discharge pressure P1 may reach the lower limit pressure PTL of the filling protocol, and hydrogen filling may be stopped. Here, when the flow rate adjusting valve opening VO is large, it is assumed that the filling work has already proceeded and the pressure of the filling target (for example, the fuel container of the fuel cell vehicle) is also high. Therefore, there is little need to continue using the hydrogen storage container 20 whose pressure has dropped, and there is no need to postpone the timing of switching to the new hydrogen storage container 20. Therefore, in step S7, the required pressure P0 (tank switching threshold value) is boosted. However, the boosted amount of the required pressure P0 can be set to a value other than 1 MPa.

When the required pressure P0 increases in step S7, the discharge pressure P1 rises and may approach the upper limit pressure PTU in the filling protocol (region X in FIG. 6), so that it is necessary to reduce the flow rate adjusting valve opening VO to keep the discharge pressure P1 away from the upper limit pressure PTU of the filling protocol. Therefore, in step S8, the flow rate adjusting valve opening VO is reduced to decrease the discharge pressure P1, and the pressure is brought close to the target pressure PT (region X1 in FIG. 6). Then, reducing the flow rate adjusting valve opening VO allows the flow rate adjusting valve opening VO to be brought closer to the range of 70% to 80% from the state where the flow rate adjusting valve opening exceeds 80%. Step S8 is executed by the flow rate adjusting valve opening degree determination block 10B. After step S8 is finished, the control ends, and after a predetermined control cycle, the control is started again.

In FIG. 7, in step S9 (when VO is 70 to 80%), the required pressure P0 is maintained at the current value without being lowered or increased (required pressure addition value is maintained at the current state). As described above, when the flow rate adjusting valve opening VO is in the range of 70% to 80%, load on the flow rate adjusting valve 3 is the least, so that if the flow rate adjusting valve opening VO is maintained in the range of 70% to 80%, stable filling is performed. After S9 is finished, the control ends, and after a predetermined control cycle, the control is started again. In FIG. 7, when the hydrogen filling is completed, the control is not started even after the control cycle has elapsed.

According to the illustrated embodiment, the control unit 10 of the filling apparatus 100 has functions of adjusting the required pressure P0 (threshold value for switching the hydrogen storage container 20 to another hydrogen storage container 20: tank switching threshold value) and adjusting the flow rate adjusting valve opening VO. Therefore, when the pressure P in the hydrogen storage container 20 is lowered and approaches the required pressure P0, the threshold value P0 is lowered to delay the timing at which the pressure P in the hydrogen storage container becomes equal to the required pressure P0. As a result, the pressure inside the tank of the hydrogen storage container 20 can be effectively used.

Further, lowering the required pressure P0 and executing a control to delay the timing of switching the hydrogen storage container 20 to another hydrogen storage container 20, and controlling and holding the flow rate adjusting valve opening VO within an appropriate range can prevent the discharge pressure P1 of the hydrogen filling apparatus 100 from falling below between the upper and lower thresholds in the filling protocol. For example, if the required pressure P0 is lowered and the discharge pressure P1 may fall below the lower limit PT of the filling protocol, it is possible to increase the flow rate adjusting valve opening VO to increase the discharge pressure P1 and prevent it from falling below the lower limit value PTL of the filling protocol. Further, when there is a risk that the required pressure P0 is lowered and the discharge pressure P1 is lowered to separate from the target value PT of the filling protocol, the flow rate control valve opening VO can be increased to increase the discharge pressure P1 to approach the target value PT of the filling protocol.

Further, when the flow rate adjusting valve opening VO is large (for example, 80% or more), even if the required pressure P0 is increased and the discharge pressure P1 is also increased to approach the upper limit value PTU of the filling protocol, reducing the flow rate adjusting valve opening VO allows the discharge pressure P1 to be kept away from the upper limit value PTU of the filling protocol. As described above, according to the illustrated embodiment, the threshold value P0 for switching the hydrogen storage container 20 to another hydrogen storage container 20 is adjusted, and the valve opening VO of the flow rate adjusting valve 3 is adjusted, so that a single hydrogen storage vessel 20 can be used for as long as possible while controlling the filling pressure according to the filling protocol, and it is possible to keep the flow rate adjusting valve opening VO within a range where burden is the least (for example, 70% to 80%).

It is added that the illustrated embodiment is merely an example and is not a description intended to limit the technical scope of the present invention. For example, in the illustrated embodiment, the filling apparatus is provided with only one filling hose having a filling nozzle, but the present invention is also applicable to a filling apparatus provided with a plurality of filling hoses.

DESCRIPTION OF THE REFERENCE NUMERALS

1 Pipe
3 Flow rate adjusting valve (flow control valve)
8 Filling hose
10 Control unit
20 Hydrogen storage container (for example, hydrogen cylinder or hydrogen storage tank)
100 Filling apparatus
P0 Required pressure (threshold value for switching a hydrogen storage container to another hydrogen storage container)
VO Flow rate adjusting valve opening

The invention claimed is:

1. A filling apparatus comprising:
a plurality of hydrogen storage containers;
a pipe capable of being disposed in communication with the plurality of hydrogen storage containers;
a filling nozzle fluidly connectable with the pipe;
a flow rate adjusting valve interposed in the pipe;
a shutoff valve positioned downstream of the flow rate adjusting valve;
a cooling unit positioned between the flow rate adjusting valve and the shutoff valve, the cooling unit being configured to lower temperature of hydrogen flowing to the shutoff valve; and
a control unit configured and adapted to facilitate:
adjusting a threshold value for switching a first one of the plurality of hydrogen storage containers communicating with the filling hose to a second one of the plurality of hydrogen storage containers;
adjusting a valve opening degree of the flow rate adjusting valve; and
lowering the threshold value to delay a timing when a pressure in the first one of the hydrogen storage containers becomes equal to the threshold value; and
a measurement signal line extending the entire distance between the filling nozzle and the control unit and configured to receive vehicle-side tank information for use by the control unit.

2. The filling apparatus as claimed in claim 1, wherein said control unit is further configured and adapted to facilitate comparing a discharge pressure with an upper limit value in a filling protocol and reducing the valve opening degree of the flow rate adjusting valve when the discharge pressure approaches the upper limit value in the filling protocol.

3. The filling apparatus as claimed in claim 1, wherein the control unit is further configured and adapted to facilitate comparing a discharge pressure with a lower limit value in a filling protocol and increasing the valve opening degree of the flow rate adjusting valve when the discharge pressure approaches the lower limit value in the filling protocol.

4. The filling apparatus as claimed in claim 2, wherein the control unit is further configured and adapted to facilitate comparing a discharge pressure with a lower limit value in a filling protocol and increasing the valve opening degree of the flow rate adjusting valve when the discharge pressure approaches the lower limit value in the filling protocol.

5. The filling apparatus recited in claim 1, wherein the control unit is configured to adjust the valve opening degree of the flow rate adjusting valve at least in part on the received vehicle-side tank information.

6. A filling method with a filling apparatus including:
a plurality of hydrogen storage containers;
a pipe capable of being disposed in communication with the hydrogen storage containers;
a filling nozzle fluidly connectable with the pipe;
a flow rate adjusting valve interposed in the pipe;
a shutoff valve positioned downstream of the flow rate adjusting valve;
a cooling unit positioned between the flow rate adjusting valve and the shutoff valve, the cooling unit being configured to lower temperature of hydrogen flowing to the shutoff valve;
a control unit; and
a measurement signal line extending the entire distance between the filling nozzle and the control unit;
the method comprising the steps of receiving vehicle-side tank information via the measurement signal line for use by the control unit, adjusting a threshold value for switching the hydrogen storage container communicating with the filling hose to another hydrogen storage container, adjusting a valve opening degree of the flow rate adjusting valve, lowering a temperature of hydrogen flowing toward the shutoff valve using the cooling unit, and decreasing the threshold value to delay a timing at which a pressure in the hydrogen storage container becomes equal to the threshold value.

7. The filling method as claimed in claim 6, further comprising the steps of comparing a discharge pressure with an upper limit in a filling protocol, and decreasing the valve opening of the flow rate adjusting valve when the discharge pressure is close to the upper limit in the filling protocol.

8. The filling method as claimed in claim 6, further comprising the steps of comparing a discharge pressure with a lower limit in a filling protocol, and increasing the valve opening of the flow rate adjusting valve when the discharge pressure is close to the lower limit in the filling protocol.

9. The filling method as claimed in claim 7, further comprising the steps of comparing a discharge pressure with a lower limit in a filling protocol, and increasing the valve opening of the flow rate adjusting valve when the discharge pressure is close to the lower limit in the filling protocol.

10. The filling method as claimed in claim 6, wherein the step of adjusting the valve opening degree of the flow rate adjusting valve includes an analysis of the received vehicle-side tank information.

* * * * *